United States Patent [19]

Darrow

[11] 4,384,250

[45] May 17, 1983

[54] VITAL VEHICLE MOVEMENT DETECTOR

[75] Inventor: John O. G. Darrow, Murrysville, Pa.

[73] Assignee: American Standard Inc., Swissvale, Pa.

[21] Appl. No.: 253,439

[22] Filed: Apr. 13, 1981

[51] Int. Cl.³ .............................................. G01P 3/56
[52] U.S. Cl. ................................ 324/161; 246/182 C; 324/166
[58] Field of Search ....................... 324/161, 166, 168; 246/182 C, 187 A, 187 C

[56] References Cited

U.S. PATENT DOCUMENTS

| | | | |
|---|---|---|---|
| 3,450,943 | 6/1969 | Burke et al. | 324/161 X |
| 3,450,944 | 6/1969 | Burke | 324/161 X |
| 3,553,488 | 1/1971 | Franke et al. | 307/231 |
| 3,553,490 | 1/1971 | Darrow | 246/187 A X |
| 3,639,753 | 2/1972 | Reich | 246/161 X |
| 3,737,806 | 6/1973 | Darrow | 331/117 R |
| 3,825,744 | 7/1974 | Sibley et al. | 246/182 C |
| 3,886,420 | 5/1975 | Butler et al. | 246/182 C X |

Primary Examiner—Stanley T. Krawczewicz
Attorney, Agent, or Firm—A. G. Williamson, Jr.

[57] ABSTRACT

The speed proportional frequency signal from the speed generator being checked is amplified and applied to a highpass filter-rectifier with a low frequency limit corresponding to a predetermined minimum train speed. Polarity of the rectified output is opposite to the DC operating energy so that, with four-terminal load resistor and smoothing capacitor, the filter-rectifier operation is vital. The rectified signal activates an oscillator level detector when its level exceeds the breakdown of a Zener diode control device selected to correspond to minimum speed output. The level detector is coupled by a stepdown transformer to a differential amplifier biased by a signal supplied from an associated zero speed detector. The bias signal has sufficient level to enable the differential amplifier to produce an output in response to the level detector input only when the train speed is greater than zero. This output represents proper operation of the axle generator and is coupled to enable the train speed governor to respond to other train control signals. When the train is stopped, the differential amplifier is biased below operating level. However, a supplemental bypass signal present only when train brakes are set is coupled through the differential amplifier output to enable the speed governor during station stops.

8 Claims, 1 Drawing Figure

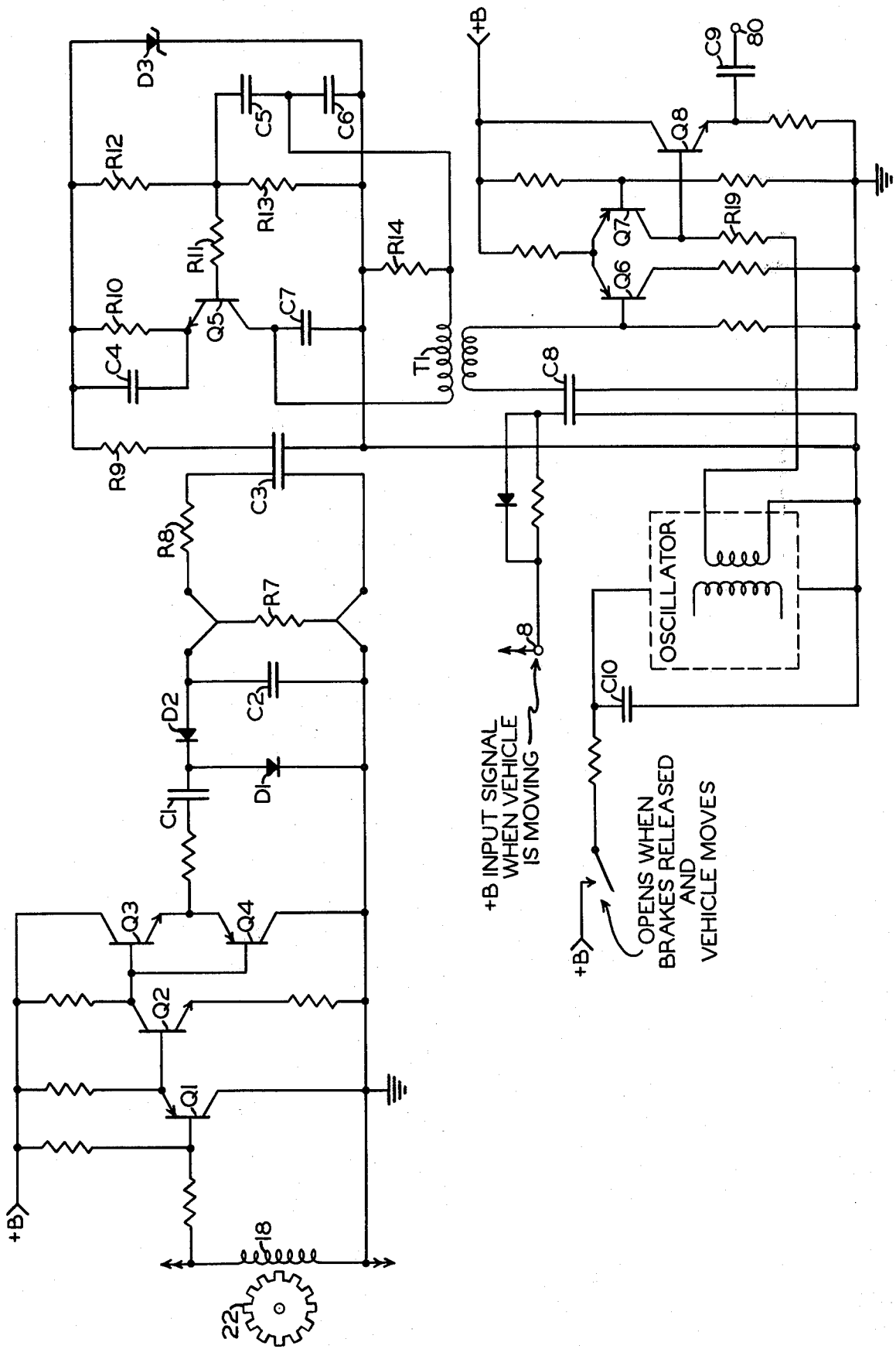

VITAL VEHICLE MOVEMENT DETECTOR

BACKGROUND OF THE INVENTION

My invention pertains to a vehicle movement detector for use with a vehicle overspeed control system. More particularly, the invention relates to a detector which checks the integrity of the vehicle speed measuring means pickup device when the vehicle is moving and provides an output signal, to enable the continued release of the vehicle brakes, only when a valid speed signal is registered.

Speed control systems for vehicles including railroad trains require apparatus for measuring the actual vehicle or train speed so that it may be compared with the desired speed. Frequently, this apparatus is of the tachometer, axle generator type which produces an alternating current signal whose frequency varies in proportion with the train speed. Integrity of the tachometer apparatus is very important because an unsafe condition can result if failure occurs, for example, if the drive shaft to the axle generator should break as the train starts to move. Therefore, some form of movement detector is required which will register the output of the tachometer or speed generator, to assure its integrity and reliability, at those times when other conditions indicate that the train is moving. In the absence of output from such a detector, a brake application is actuated. An alternate method is to use two speed pickup devices with a comparison for agreement of the outputs. However, this redundancy is costly and results in complex circuitry. Where the speed control apparatus is part of an automatic train operation system, the use of a zero velocity detector as part of the system is required to assure that door opening occurs only when the train is fully stopped at a station platform. Such zero velocity apparatus also provides a simulated tachometer signal to enable the train to start up from the station stop. An example of vital zero motion or zero speed checking apparatus for use in a train control system is disclosed in U.S. Pat. No. 3,553,488, issued Jan. 5, 1971 to John O. G. Darrow and Raymond C. Franke for a Fail-Safe Circuit Arrangement. When such zero speed checking apparatus is used with a train control system, a simple arrangement such as a high pass filter cannot be used to check tachometer integrity during train movement since the high frequency electrical check signal produced by the zero speed detector when the train is stopped is applied through the tachometer pickup element. This will result in output from the movement detector even if there is no speed signal. Since both detector arrangements are necessary in the complete system, an arrangement which inhibits this incorrect response of the movement detector to the high frequency signal from the zero speed apparatus is necessary.

Accordingly, an object of my invention is a vital vehicle movement detector for use in a speed control system in combination with a zero speed detector arrangement.

Another object of the invention is a vehicle movement detector which checks the integrity of the vehicle speed measuring apparatus when the vehicle is in motion.

A further object of my invention is a vital vehicle movement detector in which the detection of vehicle movement to register the integrity of the speed measuring device is inhibited if the associated zero velocity detector registers a vehicle at stop.

Still another object of the invention is a vehicle movement detector apparatus which is responsive to various input signals to check integrity and operation of the vehicle speed measuring axle generator device only when the train should be moving and has exceeded a preselected minimum speed level.

Yet another object of the invention is detector apparatus for use in a complete train control system, which includes a zero speed detector arrangement, to assure the integrity of the train speed pickup device only when the train is moving to enable the speed governor to retain train brakes released to continue the train movement.

Other objects, features, and advantages of my invention will become apparent from the following specification and appended claims when taken in connection with the accompanying drawing.

SUMMARY OF THE INVENTION

The movement detector arrangement comprises, in sequence, an amplifier network for receiving the input signals from the tachometer speed generator, a high pass filter and rectifier network, a level detector element, and a differential amplifier, all formed by solid-state circuit elements. In operation, signals from the vehicle or train tachometer device or axle generator pickup coil are applied to the initial amplifier network. Specifically, this is an alternating current signal with a frequency proportional to the vehicle speed. The same signal is applied to the zero velocity detector network of the vehicle used in the train control system, an example of which is shown in the previously cited patent. When the train is stopped, the speed generator pickup coil is supplied with a signal from an oscillator element to check the electrical integrity of the tachometer pickup, which is part of the circuit to enable the door opening action and to prevent an emergency brake application during a station stop. In the presently disclosed arrangement, the input signal is amplified, and then filtered and rectified by a high pass unit. The lower limit of the filter portion of this unit represents a predetermined minimum speed level at which vehicle movement is evident. The rectifiers used are poled to provide an output polarity opposite to that of the direct current energy source which supplies power for operation of the apparatus. Since its load is a four-terminal resistor, and since shorting the series capacitor would cause a loss of output, operation of the filter, rectifier network is thus on a vital basis, that is, it cannot fail so as to deliver full output at a low frequency. The rectified direct current output, smoothed in an output stage of the filter-rectifier including a vital four-terminal capacitor to prevent ripple from the rectifier from substituting for the following level detector's alternating current output, is applied to an oscillator based level detector element. Circuit parameters are selected so that the level of this direct current signal is sufficient to trigger an oscillatory response by the level detector only if the initial input signal frequency is high enough to pass through the filter element, that is, if the train speed is greater than the predetermined minimum speed. To inhibit the detection of the zero velocity oscillator input as a valid tachometer pickup, a differential amplifier element biased by the gating signal from the zero velocity apparatus is coupled to the level detector via a transformer which provides only a small level output signal.

When the train is moving, a steady positive biasing signal is applied to the differential amplifier to enable it to pass the low level input signal provided by the level detector output. The output of the differential amplifier complex enables the speed governor to produce an output, other conditions being proper, so that the train braking remains released and continued movement occurs. When the train stops at a station under normal, i.e., not emergency, braking, the zero velocity oscillator signal comprises periodic pulses so that the resultant bias signal level is insufficient to enable the differential amplifier. Lack of response by this element to the level detector input signal eliminates the normal output from the movement detector network so that the speed governor would no longer be enabled to actuate release of the brakes. In other words, no false signal of the integrity of the tachometer pickup element is produced as a result of the simulated speed signal from the zero velocity oscillator. However, when the train has stopped at a station and the brakes are set, an interim enabling signal is supplied from a separate oscillator to the speed governor so that the movement detector is effectively bypassed, for a time period, until the minimum speed level is again reached. The train may thus renew its movement at such time as the train control system directs.

BRIEF DESCRIPTION OF THE DRAWING

Before defining the invention in the appended claims, I shall describe a specific arrangement of the invention illustrated in the accompanying drawing, which is a schematic circuit diagram of a preferred embodiment of the on-board vital movement detector as used in a train speed control system.

DESCRIPTION OF THE ILLUSTRATED EMBODIMENT

Referring to the drawing, the first stage or portion of the movement detector apparatus shown at the left is the amplifier element including the four transistors Q1 to Q4. Energy for the operation of this amplifier and for the remainder of the detector apparatus is supplied from a direct current source of any known type. Connections to the positive terminal of this source are designated by the reference +B. The negative terminal of this source is represented by the conventional ground symbol shown as connected to the common or ground bus of the apparatus. The input to the amplifier, that is, the base to collector electrodes of transistor Q1, is connected across the inductance coil 18 which is part of the speed measuring means of the train and is wound on a permanent magnet. This speed measuring means also includes a gear wheel 22 of magnetic material which is driven by a train axle and is positioned so that it is near one end of the magnet on which is wound coil 18. The combination of these elements comprises an axle driven speed generator or tachometer and is the same as the similarly designated elements shown in the previously cited U.S. Pat. No. 3,553,488. The parallel connections to the elements of the zero velocity detector of this cited patent are illustrated by the conventional double arrowhead symbols. Since the apparatus of the present application is designed to work in conjunction with a slightly modified version of this zero velocity detection apparatus, as will be shortly discussed, that portion of the prior patent disclosure necessary for a full understanding of the present apparatus is made part of this specification.

When the train is moving, an alternating current signal is induced in coil 18 having a frequency proportional to the speed of a train. Coil 18 is also part of the feedback circuit of an oscillator element 1 of the zero velocity detector which is periodically enabled by a gating signal when the train is stopped, as explained in the cited patent. Thus alternating current pulses are produced across coil 18, during a train stopped condition, with a frequency predetermined by the oscillator network parameters. The pulse rate at which these signals are generated is determined by the element parameters in the zero velocity detector, also as explained in the cited patent, and are not pertinent here. However, the frequency of the alternating current generated by this oscillator network is within the operating frequency range of the tachometer when the train is moving so that a filter tuned to pass the signals representing train speed will also pass the oscillator pulses produced within the zero velocity detector.

Returning to the present apparatus, the input signal from coil 18 is amplified in the initial transistor network, as previously mentioned. The output of this amplifier is filtered and rectified in the next element which includes capacitors C1 and C2, diodes D1 and D2, and a four terminal load resistor R7. The values of capacitors C1 and C2 are selected in relation to the value of resistor R7 so as to form a high pass filter whose lower limit is representative of the output frequency of the tachometer at a predetermined minimum speed of the train. The diodes or half wave rectifiers D1 and D2 are poled so as to produce an output polarity across resistor R7 that is opposite to that of the direct current energy supply from terminal +B. Under this provision, plus the fact that load resistor R7 is a four terminal vital element, the filter-rectifier network constitutes a vital, high pass filter incapable of delivering an inappropriate output due to a component failure such as the shorting of series capacitor C1. The direct current output from this stage, appearing across resistor R7, is filtered or smoothed in the network including resistor R8 and capacitor C3. It may be noted that capacitor C3 is a four terminal element in order to provide a vital smoothing filter network.

The output voltage of the filter-rectifier stage appearing across capacitor C3 is applied to the level detector element whose principal components are the transistor Q5, the Zener diode D3, and output transformer T1. This level detector network is similar to that disclosed in my prior U.S. Pat. No. 3,737,806, issued June 5, 1973, for a Fail-Safe Circuit Arrangement. Reference is made to this patent for a full description of the operation of this level detector. Briefly, the detector is an oscillator based on transistor Q5 (reference T1 in the patent) and a voltage breakdown device such as diode D3 (Z1 in the patent). The oscillator becomes active, i.e., sufficient feedback exists to sustain oscillation, only when the DC input is of sufficient level to cause diode D3 to break down, i.e., conduct in the reverse direction, and assume a low impedance condition. In this application, the level detector is actuated, i.e., oscillation begins, when train speed is at or above the selected minimum. The frequency of the tachometer output is then such that a sufficient signal passes through the filter network of capacitors C1, C2 and resistor R7 to produce a sufficient level of applied rectified direct current energy to break down diode D3.

In this present application, the level detector or oscillator output is taken from the voltage drop across the inductance, shown in the patent as winding L1, by adding a secondary winding to form coupling or output transformer T1. The added secondary is wound with only a very few turns so that transformer T1 acts to step down the voltage drop in producing the output signal. To further aid the cross reference to the cited U.S. Pat. No. 3,737,806, capacitors C1, C2, C3 of the patent are equivalent to capacitors C5, C6, and C7, respectively, of this present arrangement, with capacitor C4 and resistor R10 herein being the same as capacitor C4 and resistor R5 of the patent.

Normally the level detector output occurs when the speed of the train is above the predetermined minimum level. However, the oscillator level detector is also actuated when the train is stopped, by the high frequency signals from the associated zero velocity oscillator apparatus with which this arrangement cooperates in the train control system. The manner in which this signal is generated and applied is discussed in the cited prior U.S. Pat. No. 3,553,488 to which reference is made for exact details. What is important in the present arrangement is that the output of this movement detector must be inhibited under this condition, that is, when the train is actually stopped and the zero velocity oscillator is active.

To accomplish this, the output of the level detector stage from the secondary of transformer T1 is supplied to the input of a differential amplifier element formed by transistors Q6 and Q7 and the associated resistor units. This input is supplemented from terminal 8 through four terminal capacitor C8 to provide a bias signal or level for the differential amplifier. Terminal 8 represents the lead 8 in the cited prior U.S. Pat. No. 3,553,488 which carries the gating signal provided at emitter 59 of the switching transistor T6 in that patent. In the specific zero velocity apparatus associated with the movement detector disclosed herein, the zero velocity arrangement is modified so that the polarity of the signals is reversed from that discussed in the prior patent. In other words, lead or terminal 8 has a +B signal when the vehicle is moving at more than a predetermined minimum speed level. When the vehicle is stopped so that there is no output from the tachometer speed generator, terminal 8 is periodically lowered to a ground level signal as the zero velocity apparatus, particularly its oscillator element 1 is actuated and functions to detect this stopped condition. Said in another way, in the modified patent system, the oscillator based on transistor T1 oscillates when lead 8 from emitter 59 has a negative or ground signal. If the gate signal on lead 8 is at +B, no oscillation can occur in the zero velocity detector so that no signal is produced in coil 18 other than that from the tachometer gear device 22.

With the input on terminal 8 at the +B level, a positive voltage appears on the upper plate of capacitor C8. The differential amplifier including transistors Q6 and Q7 is then biased so that the low level output signal from the secondary of transformer T1 is amplified and applied to transistor Q8. This output amplifier element then provides an alternating current output through capacitor C9 to terminal 80 from whence it is supplied to enable the speed governor for the train control apparatus to actuate circuitry which allows continued train movement. If the signal at lead 8 is at ground, oscillations in the zero velocity apparatus occur. As explained, terminal or lead 8 periodically switches between +B and ground potentials during this condition. The summed voltage developed on capacitor C8 is then at such a low level that the differential amplifier is biased outside its operating range. The output from transformer T1 is blocked and no output thus occurs from transistor Q8 to terminal 80. Thus, under any condition that the high frequency from the zero velocity apparatus could turn on the level detector, its output will be blocked by the differential amplifier action and a signal on terminal 80 is inhibited. Thus, a final enabling output from transistor Q8 will occur only when the vehicle is moving above a predetermined speed.

The only other condition which must be considered is to provide an output from the movement detector apparatus when the vehicle or train is stopped and the brakes are applied, in order that the speed governor is not shut off to inhibit a restart of train movement. This is accomplished by means of the oscillator unit shown conventionally as a dashed block in the lower part of the drawing. When active, this unit supplies its output signal through the collector resistor R19 of transistor Q7 to the base electrode of transistor Q8. This signal is amplified by this transistor and applied through capacitor C9 to terminal 80. This action is possible since, under a train stopped condition, transistor Q7 is turned off because of the biasing conditions from terminal 8. When the vehicle begins to move, the brake switch shown schematically, which may be one of the manual control contacts, opens. The oscillator remains activated for a brief time by the charge across capacitor C10, which must have a time constant long enough to overlap the time it takes the train to reach the minimum speed at which the normal apparatus senses its movement and provides the enabling output at terminal 80 through the level detector and differential amplifier, as already described.

It thus is seen that the enabling output at terminal 80 is obtained only if either the tachometer is properly operating or if the train is stopped and the brakes applied. No failure can cause this output in the absence of one of these conditions. Thus, the failure of the tachometer element will be assuredly detected and the enabling signal eliminated or inhibited so as to cause the train to be halted. This result is obtained in an efficient and economic manner by the movement detector apparatus of my invention.

Although I have herein shown and described but a single embodiment of the vital movement detector apparatus of my invention, it is to be understood that changes and modifications therein within the scope of the appended claims may be made without departing from the spirit and scope of my invention.

Having now described the invention, what I claim as new and desire to secure by Letters Patent, is:

1. A vital vehicle movement detector, for assuring the integrity of vehicle speed measuring apparatus, comprising, (a) input means coupled for receiving speed signals from said speed measuring apparatus and responsive for supplying corresponding output signals with characteristics representing vehicle speed,
   (b) a filter-rectifier network coupled to said input means for producing a selected polarity output signal only in response to input signals representing at least a predetermined minimum vehicle speed,
   (c) a level detector means coupled to said filter-rectifier network and operable for producing an output when the level of said selected polarity signal indicates a vehicle speed at least equal to said predetermined minimum, (d) a differential amplifier means coupled to receive the output of said level detector means and responsive thereto for producing an output signal only when enabled by a bias signal of preselected characteristic and at least a predetermined minimum level,
  (1) said differential amplifier means also coupled for supplying said output signal to enable continued movement of said vehicle, and
(e) an inhibitor circuit means coupled to said differential amplifier means for supplying said bias signal having said preselected characteristic and predetermined level only when said vehicle speed is greater than zero.

2. A vehicle movement detector as defined in claim 1 in which,
  (a) said speed signals are alternating current signals having a frequency characteristic proportional to vehicle speed, and
  (b) said filter-rectifier network is tuned as a high pass filter with a low frequency limit at the frequency representing said predetermined minimum vehicle speed.

3. A vehicle movement detector as defined in claim 2 in which,
  said input means is an amplifier network operable for supplying amplified speed signals with frequency proportional to vehicle speed to said filter-rectifier network.

4. A vehicle movement detector as defined in claim 3 in which said filter-rectifier network comprises,
  (a) a vital loading element,
  (b) a pair of capacitors of preselected values coupled for coacting with said loading element to pass only signals having valid frequency characteristics representing at least said predetermined minimum speed level, and
  (c) a pair of diodes interconnected with said loading element and said capacitors for applying a voltage signal of said selected polarity across said loading element when valid speed signals are received from said input amplifier network.

5. A vehicle movement detector as defined in claim 1, 2, or 4 in which said level detector comprises,
  (a) an oscillator element having an oscillatory feedback circuit,
  (b) a normally nonconducting voltage breakdown device coupled into said oscillatory feedback circuit for blocking feedback signals to inhibit operation of said oscillator element,
    (1) said voltage breakdown device connected to receive said selected polarity signal and responsive thereto when said predetermined speed level is attained for assuming a conducting condition to complete said oscillator feedback circuit and enable oscillator operation, and
  (c) an output means coupled to said oscillator element for supplying said oscillation signal to said differential amplifier.

6. A vehicle movement detector as defined in claim 5 which further includes,
  (a) another output means coupled to said differential amplifier means and operable for supplying a signal to enable continued movement of said vehicle when a differential amplifier output is present, and
  (b) a supplemental signal source active only when said vehicle is stopped and its brakes applied,
  (c) said supplemental source coupled to said output means for supplying an enabling output signal when said differential amplifier is biased to an inactive condition and existing vehicle conditions activate said supplemental source.

7. A vehicle movement detector as defined in claim 6 in which,
  (a) said voltage breakdown device is a Zener diode having a reverse breakdown voltage selected at a predetermined level of said selected polarity signal developed when said vehicle speed equals and is greater than said predetermined minimum speed,
  (b) said oscillator output means is a stepdown transformer having its primary winding coupled into said oscillator feedback circuit, and
  (c) said biasing signal is received from a separate source coupled to the input of said differential amplifier and which produces a biasing signal having said preselected characteristic and predetermined level only when said vehicle speed is greater than zero.

8. A vehicle movement detector as defined in claim 7 in which,
  (a) said vital loading element of said filter-rectifier network is a vital four terminal resistor,
  (b) said diodes are poled for producing a selected polarity signal across said vital resistor opposite to the polarity of the operating energy for said input amplifier network and said differential amplifier means,
  (c) whereby the operation of said high pass filter network is on a vital basis so that a valid selected polarity output signal is produced only when the input speed signal frequency is at or above the filter lower limit and no fault exists within any of said resistor, capacitor, and diode components.

* * * * *